United States Patent
Ogawa

(10) Patent No.: US 9,258,106 B2
(45) Date of Patent: Feb. 9, 2016

(54) COMMUNICATION APPARATUS, TIME SYNCHRONIZATION SYSTEM, AND TIME SYNCHRONIZATION METHOD

(71) Applicant: NEC Corporation, Tokyo (JP)

(72) Inventor: Takatoshi Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/417,312

(22) PCT Filed: Apr. 1, 2013

(86) PCT No.: PCT/JP2013/002214
§ 371 (c)(1),
(2) Date: Jan. 26, 2015

(87) PCT Pub. No.: WO2014/016993
PCT Pub. Date: Jan. 30, 2014

(65) Prior Publication Data
US 2015/0180641 A1    Jun. 25, 2015

(30) Foreign Application Priority Data
Jul. 27, 2012 (JP) .................................. 2012-166669

(51) Int. Cl.
H04L 7/00 (2006.01)
G04R 20/06 (2013.01)
(Continued)

(52) U.S. Cl.
CPC .............. *H04L 7/0016* (2013.01); *G04R 20/06* (2013.01); *H04B 7/18515* (2013.01); *H04L 7/00* (2013.01); *H04J 3/0641* (2013.01); *H04J 3/0644* (2013.01); *H04J 3/0667* (2013.01)

(58) Field of Classification Search
CPC ......... H04L 7/0016; H04L 76/10; H04L 7/00; H04B 7/18515

USPC .......................................... 375/354, 355, 358
See application file for complete search history.

(56) References Cited

U.S. PATENT DOCUMENTS 5,995,570 A * 11/1999 Onvural et al. ............... 375/356
6,381,660 B1 * 4/2002 Ito ................................. 710/58
(Continued)

FOREIGN PATENT DOCUMENTS

JP     2009-65579      3/2009
JP     2010-62703      3/2010
(Continued)

OTHER PUBLICATIONS

International Search Report and Written Opinion mailed May 21, 2013 in corresponding PCT International Application.

*Primary Examiner* — Qutbuddin Ghulamali
(74) *Attorney, Agent, or Firm* — Finnegan, Henderson, Farabow, Garrett & Dunner LLP

(57) ABSTRACT

A communication apparatus (13) according to the present invention is provided with: a storage unit (131) that stored in advance difference information (1311), which is the difference between first time information (t1) and second time information (t2), said first time information (t1) being received from a synchronization source communication apparatus (11) as a time synchronization source connected to a transmission system (12) wherein transmission delay time is different depending on the direction of transmission, and said second time information (t2) obtained from a time synchronization origin (14) other than the transmission system (12); and a time synchronization means (132) that carries out, when the second time information (t2) cannot be obtained from the time synchronization origin (14), time synchronization with the synchronization source communication apparatus (11) using the difference information (1311) read out from the storage unit (131).

20 Claims, 5 Drawing Sheets

(51) Int. Cl.
*H04B 7/185* (2006.01)
*H04J 3/06* (2006.01)

(56) References Cited

U.S. PATENT DOCUMENTS

2010/0054232 A1* 3/2010 Asano ........................... 370/349
2010/0265968 A1* 10/2010 Baldemair et al. ............ 370/503
2011/0158114 A1* 6/2011 Novak et al. .................. 370/252

FOREIGN PATENT DOCUMENTS

| JP | 2010-278546 | 12/2010 |
| JP | 2011-122983 | 6/2011 |
| JP | 2011-135482 | 7/2011 |

* cited by examiner

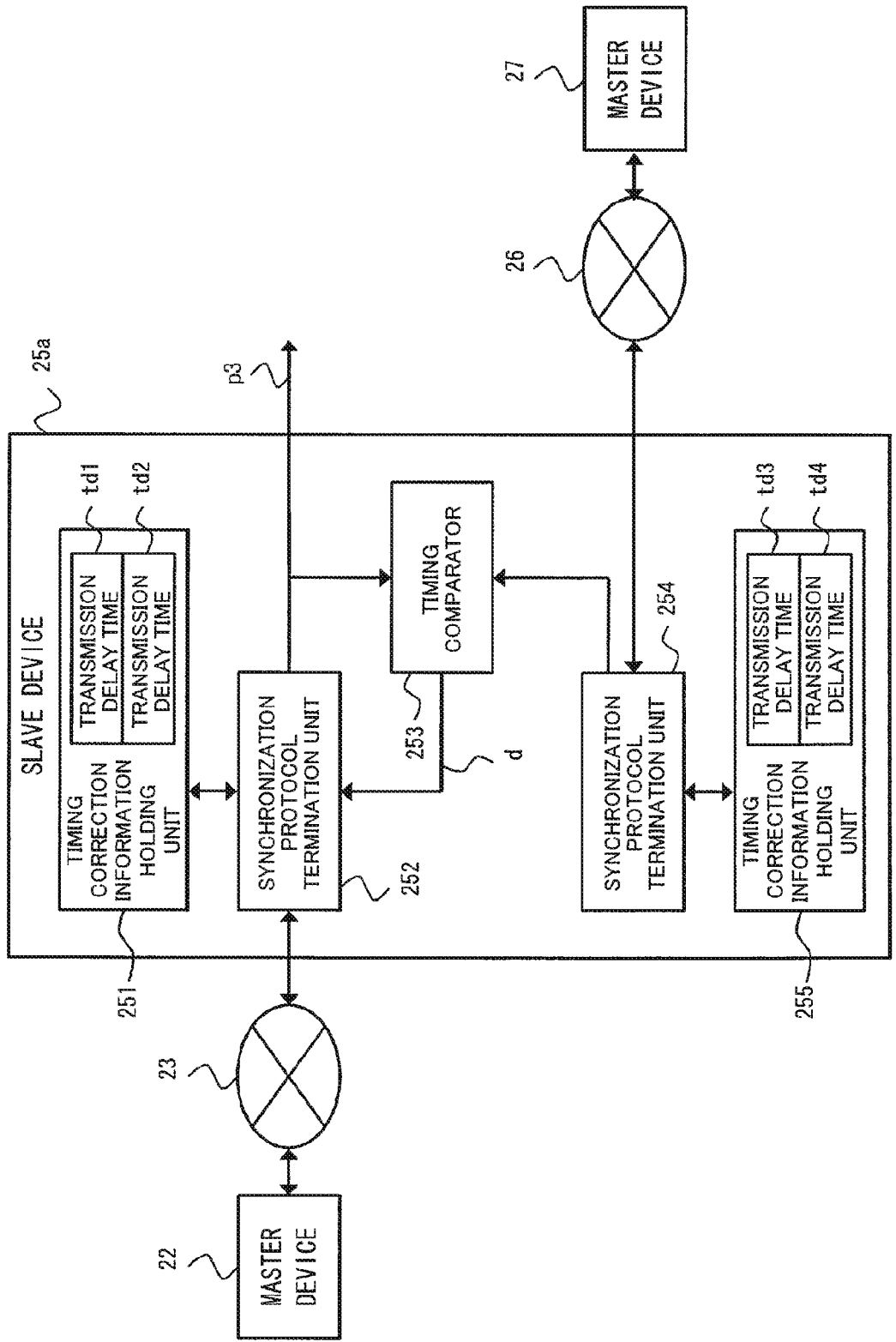

COMMUNICATION APPARATUS, TIME SYNCHRONIZATION SYSTEM, AND TIME SYNCHRONIZATION METHOD

CROSS-REFERENCE TO RELATED PATENT APPLICATIONS

This application is a National Stage Entry of International Application No. PCT/JP2013/002214, filed Apr. 1, 2013, which claims priority from Japanese Patent Application No. 2012-166669, filed Jul. 27, 2012. The entire contents of the above-referenced applications are expressly incorporated herein by reference.

TECHNICAL FIELD

The present invention relates to a communication apparatus, a time synchronization system, and a time synchronization method, particularly a communication apparatus, a time synchronization system, and a time synchronization method for time synchronization in a transmission system having asymmetrical delay characteristics in which transmission delay time is different depending on the direction of transmission.

BACKGROUND ART

Generally, in a base station of a mobile communication, accuracy of time synchronization of several micro seconds or less is required. A time synchronization system, like GNSS (Global Navigation Satellite System), is therefore used. IEEE (The Institute of Electrical and Electronics Engineers) 1588 which defines the method for synchronizing a device on a network with accuracy of less than a micro second, can also be used for time synchronization.

PTL 1 discloses a technology on the time synchronization network and the communication apparatus which achieve time synchronization within required accuracy without increasing a network load or without increasing cost of mounting a highly accurate oscillator, when a base station which carries out time synchronization on the basis of GPS (Global Positioning System) and a base station which carries out time synchronization on the basis of GPS through a packet network using protocol, like IEEE 1588 exist in the same network.

PTL 2 discloses the technology related to the time synchronization system which synchronizes a time at a slave node to a time at a master node using protocol, like IEEE 1588.

CITATION LIST

Patent Literature

PTL 1: Japanese Patent Application Laid-Open No. 2010-278546
PTL 2: Japanese Patent Application Laid-Open No. 2011-135482

SUMMARY OF INVENTION

Technical Problem

However, PTLs 1 and 2 include a problem in which time synchronization become indefinite when a transmission path has asymmetrical delay characteristics. The reason is described below.

In order to stably carry out time synchronization in GNSS, sky view has to be sufficiently secured. However, since full sky view may not be obtained in an urban area due to building wall placement or surrounding obstacles, stability problem exists. Using a broadcasting wave from a satellite, GNSS is a system which is not relatively subjected to disturbance from the outside. Holdover situation however may occur and time synchronization may be lost because of suspension of GNSS, shielding of a transmission path, interference by an interrupting wave, failure of a receiving apparatus, or the like. Hence, fault-tolerance has to be improved.

Therefore, a GNSS receiver is required to keep time synchronization by itself even in Holdover situation. In order to keep time synchronization for a practical-level period of time as described above, a large and expensive frequency source, such as OCXO (Oven Controlled Xtal Oscillator) with high long-term stability, an atomic oscillator, or the like, has to be used.

Accordingly in order to reduce cost of GNSS, as disclosed in PTL 1 or 2, IEEE 1855 system, like NTP (Network Time Protocol) or PTP (Precision Time Protocol), which carries out time synchronization by superimposing on a transmission system, is used. Since the above system is superimposed on the transmission system, fluctuation of delay amount between transmission apparatuses may vary depending on transmission path environment or delay amount may be different depending on a transmission path. Therefore, time synchronization becomes indefinite.

Here, the fluctuation of delay amount can be corrected to some extent by averaging arrival times or pulling the shortest arrival. However, time synchronization between apparatuses cannot be carried out as described below, if delays of bi-directional transmission paths are different.

A situation in which a time of a slave device is synchronized with a time of a master device is explained below. Initially the master device transmits a packet including information of a time A1 in the master device to the slave device. The time A1 is, for example, a transmitting time of the packet. The slave device which has received the packet can calculate its own time B1 by using a transmission delay time X from the master device to the slave device on the basis of the following equation (1).

$$B1 = A1 + X \quad (1)$$

At this time, however, since the times of the master device and the slave device do not synchronize, the transmission delay time X cannot be calculated accurately. Thus, a packet transmission delay time Y of the opposite direction is further used, that is, when the packet is transmitted from the slave device to the master device. That is to say, packets having information on the transmitting time are sent back by return between the master device and the slave device whose times are determined. Thereby the bidirectional delay amount is calculated and a half thereof is estimated as the transmission delay time X' (e.g. equation (2)). The time B of the slave device is calculated on the basis of the following equation (3) and synchronization with the time A of the master device becomes possible.

$$X' = (X+Y)/2 \quad (2)$$

$$B = A + X' \quad (3)$$

Here, in the above description, delay time X=delay time Y is premised. If the delays of bi-directionally transmission paths are different, time difference between X and Y becomes an offset error of the time B and autonomous resolution is impossible. Therefore, time synchronization between the master device and the slave device cannot be carried out and time synchronization becomes indefinite.

The invention is made in consideration of the above problem, and an object thereof is to provide a communication apparatus, a time synchronization system, and a time synchronization method which keep time synchronization accuracy in a transmission system having asymmetrical delay characteristics in which a transmission delay time is different depending on the direction of transmission.

Solution to Problem

A communication apparatus of a first aspect of the invention includes a storage unit that stores in advance difference information between first time information and second time information, the first time information being received from a synchronization source communication apparatus, as a time synchronization source, connected to a transmission system wherein a transmission delay time is different depending on the direction of transmission and the second time information obtained from a time synchronization origin other than the transmission system, and time synchronization means for carrying out, when the second time information cannot be obtained from the time synchronization origin, time synchronization with the synchronization source communication apparatus using the difference information read out from the storage unit.

A time synchronization system of a second aspect of the invention includes a transmission system in which a transmission delay time is different depending on the direction of transmission, a first communication apparatus that is connected to the transmission system, as a time synchronization source, a time synchronization origin other than the transmission system, and a second communication apparatus that is connected to the transmission system and the time synchronization origin and carries out time synchronization on the basis of time information of the first communication apparatus. The second communication apparatus includes a storage unit that stores in advance difference information between first time information received from the first communication apparatus and second time information obtained from the time synchronization origin, and time synchronization means for carrying out, when the second time information cannot be obtained from the time synchronization origin, time synchronization with the first communication apparatus using the difference information read out from the storage unit.

A time synchronization method of a third aspect of the invention includes receiving first time information from a synchronization source communication apparatus, as a time synchronization source, connected to a transmission system wherein transmission delay time is different depending on the direction of transmission, obtaining second time information from a time synchronization origin other than the transmission system, calculating difference information between the first time information and the second time information, storing the difference information in a storage unit, after that, reading out the difference information from the storage means when the second time information cannot be obtained from the time synchronization origin, and carrying out time synchronization with the synchronization source communication apparatus using the difference information read out from the storage unit.

Advantageous Effects of Invention

The invention is made in consideration of the above problems, and can provide a communication apparatus, a time synchronization system, and a time synchronization method which keep time synchronization accuracy in a transmission system having asymmetrical delay characteristics in which a transmission delay time is different depending on the direction of transmission.

BRIEF DESCRIPTION OF DRAWINGS

FIG. 5 is a block diagram illustrating a configuration of a slave device of an exemplary embodiment 3 of the invention.

DESCRIPTION OF EMBODIMENTS

Specific exemplary embodiments to which the invention is applied are described below in detail by referring to drawings. In each of drawings, the same element has the same sign, and repeated explanations are omitted as necessary in order to clarify the explanations.

An Exemplary Embodiment 1 of the Invention

Figure 1:
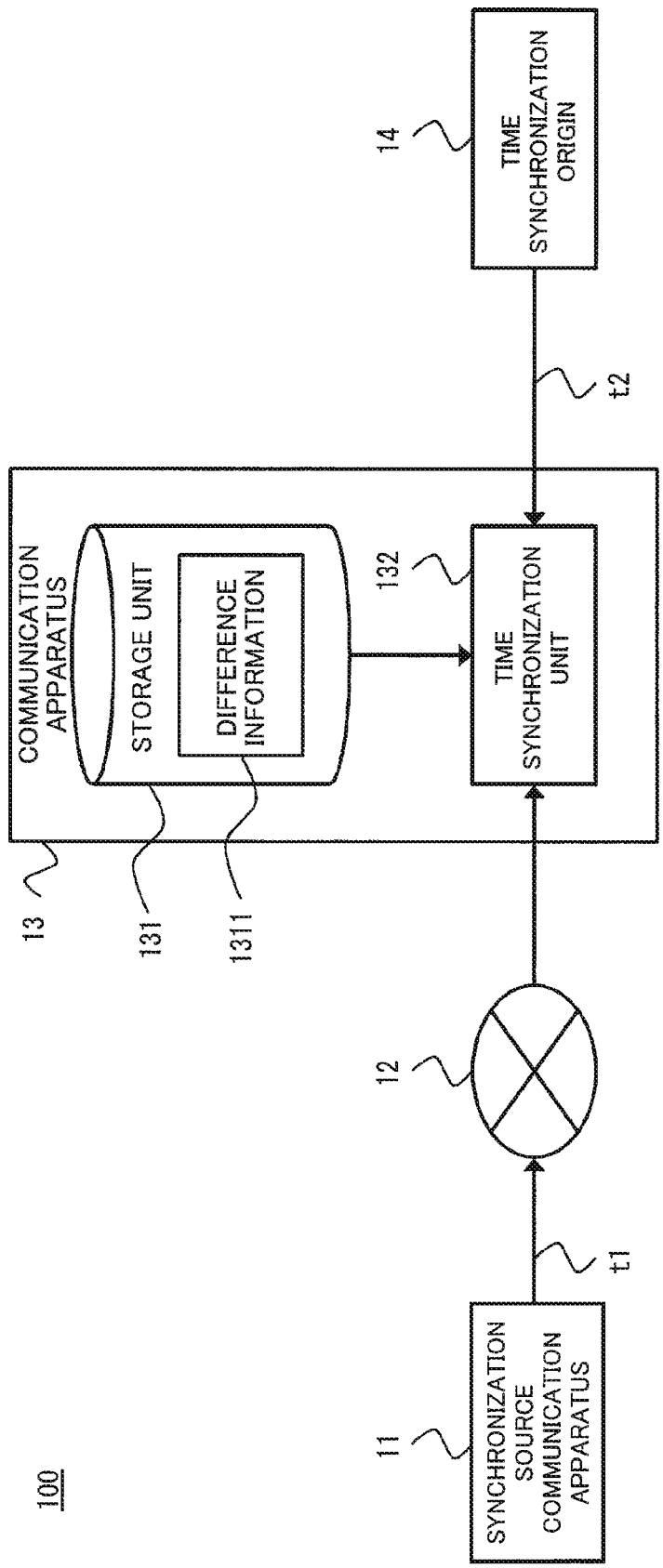
FIG. 1 is a block diagram illustrating a configuration of a time synchronization system of an exemplary embodiment 1 of the invention.

FIG. 1 is a block diagram illustrating a configuration of a time synchronization system 100 of an exemplary embodiment 1 of the invention. The time synchronization system 100 includes a synchronization source communication apparatus 11, a transmission system 12, a communication apparatus 13, and a time synchronization origin 14. In the transmission system 12, a transmission delay time is different depending on the direction of transmission. That is to say, the transmission system 12 includes asymmetrical transmission delay characteristics. The synchronization source communication apparatus 11 is connected to the transmission system 12 and is a first communication apparatus as a synchronization source of a time. The synchronization source communication apparatus 11 is, for example, a master device in time synchronization. The time synchronization origin 14 is a communication apparatus, a transmission system, a satellite positioning system, satellite navigation system, or the like, which is a time synchronization origin other than the transmission system 12.

The communication apparatus 13 is a second communication apparatus which is connected to the transmission system 12 and the time synchronization origin 14 and carries out time synchronization on the basis of first time information t1 of the synchronization source communication apparatus 11. The communication apparatus 13 is a slave device in time synchronization.

The communication apparatus 13 includes a storage unit 131 and a time synchronization unit 132. The storage unit 131 stores in advance difference information 1311 between the first time information t1 received from the synchronization source communication apparatus 11 and second time information t2 obtained from the time synchronization origin 14. If the time synchronization unit 132 cannot obtain the second time information t2 from the time synchronization origin 14, the unit 132 carries out time synchronization with the synchronization source communication apparatus 11 using the difference information 1311 read out from the storage unit 131.

Carrying out time synchronization with the synchronization source communication apparatus 11 via the transmission system 12 having an asymmetrical transmission delay time, the time synchronous system 100 and communication apparatus 13 of the exemplary embodiment 1 of the invention use the second time information t2 obtained from the time synchronization origin 14 which gives a stable time. By storing in advance the difference information 1311 between the first time information t1 and the second time information t2, it is also possible to carry out time synchronization using the difference information 1311 which is already stored even though the latest second time information t2 cannot be obtained from the time synchronization origin 14. Therefore, in a transmission system having asymmetrical delay characteristics in which a transmission delay time is different depending on the direction of transmission, accuracy of time synchronization can be maintained.

An Exemplary Embodiment 2 of the Invention

Figure 2:
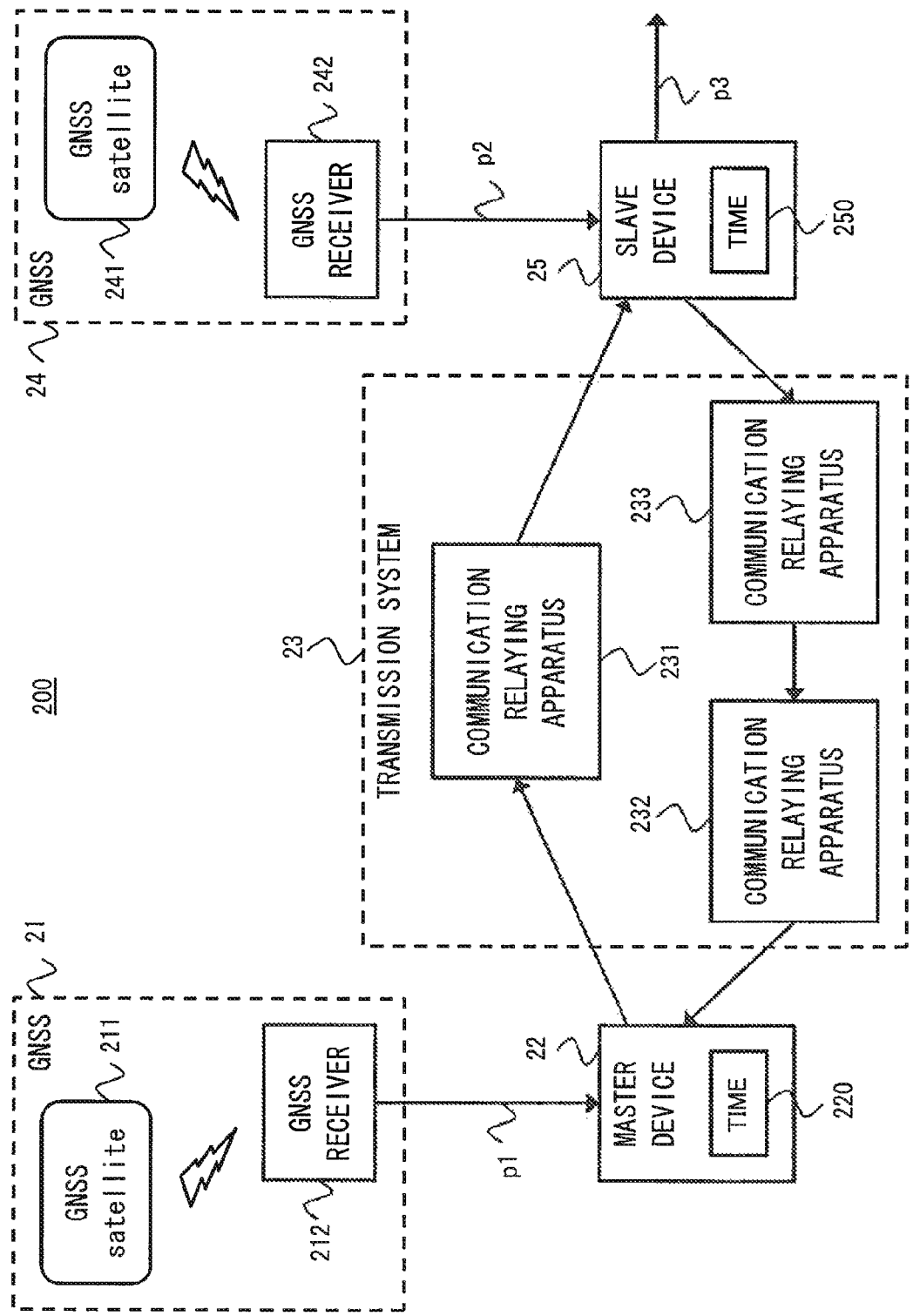
FIG. 2 is a block diagram illustrating a configuration of a time synchronization system of an exemplary embodiment 2 of the invention.

FIG. 2 is a block diagram illustrating a configuration of a time synchronization system 200 of an exemplary embodiment 2 of the invention. The time synchronization system 200 is one example of the exemplary embodiment 1. The time synchronization system 200 includes a GNSS 21, a master device 22, a transmission system 23, a GNSS 24, and a slave device 25. The time synchronization system 200 synchronizes time information 250 of the slave device 25 with time information 220 of the master device 22.

The GNSS 21 and the GNSS 24 are a satellite positioning systems or satellite navigation systems which are different from each other. The GNSS 21 includes a GNSS satellite 211 and a GNSS receiver 212. The GNSS receiver 212 receives a signal from the GNSS satellite 211 and transmits time/timing pulse output p1. The GNSS 24 includes a GNSS satellite 241 and a GNSS receiver 242. The GNSS receiver 242 receives a signal from the GNSS satellite 241 and transmits time/timing pulse output p2. The GNSS 24 is an example of the time synchronization origin 14 above described.

The GNSS 21 includes fault-tolerance such as redundancy. On the other hand, in the GNSS 24, redundancy and fault tolerance for low cost and miniaturization are in a low level, compared with the GNSS 21. Since the GNSS 21 and the GNSS 24 can employ publicly known technologies if they can be time reference, detailed explanations thereof are omitted. As the GNSS 21 and the GNSS 24, a time synchronization system, like GPS, Galileo (Galileo (positioning system)), GLONASS (Global Navigation Satellite System), or Beidou (BeiDou Navigation Satellite System) can be employed.

The master device 22 is one example of the synchronization source communication apparatus 11 above described. The master device 22 acquires the time/timing pulse output p1 which is time reference from the GNSS receiver 212, and holds as the time information 220. The master device 22 is connected to the transmission system 23 in order to transmit and receive a packet for time synchronization with the slave device 25 controlled thereby. Since the other configurations in the master device 22 can use publicly known technologies, detailed explanations thereof are omitted.

The transmission system 23 is one example of the transmission system 12 described above. The transmission system 23 includes communication relaying apparatuses 231 to 233. A transmission path from the master device 22 to the slave device 25 is routed through the communication relaying apparatus 231. On the other hand, a transmission path from the slave device 25 to the master device 22 is routed through the communication relaying apparatuses 233 and 232. That is to say, in the transmission system 23, bidirectional transmission paths between the master device 22 and the slave device 25 are different each other. In the transmission system 23, therefore, bidirectional transmission delay times are different each other, that is, asymmetrical delay characteristics exist. FIG. 2 shows a case in which, in the transmission system 23, the bidirectional transmission paths are different from each other. Specifically, a case is shown, in which the number of the communication relaying apparatuses which is located between the master device 22 and the slave device 25 is different depending on the direction of transmission. However, a route of the transmission system 23 is not limited thereto. For example, like ADSL (Asymmetric Digital Subscriber Line), one which includes asymmetrical delay characteristics in which upstream communication speed is different from downstream communication speed in the same bidirectional transmission path may be employed. Since publicly known technologies are employed for the transmission system 23 and the communication relaying apparatuses 231 to 233, detailed explanations thereof are omitted. As the transmission system 23, a bidirectional network system, like Ethernet (trade mark), can be used.

The slave device 25 is one example of the communication apparatus 13 above described. The slave device 25 is connected to the transmission system 23 and receives the time information from the slave device 25. Further, the slave device 25 acquires, separately from the transmission system 23, the time/timing pulse output p2 which is time reference from the GNSS receiver 242. Furthermore, the slave device 25 calculates difference information between the time information 220 and the time/timing pulse output p2, and stores the difference information in the storage unit. Then, the slave device 25 calculates and holds the time information 250 on the basis of the time information 220 and the time/timing pulse output p2. Besides, the slave device 25 outputs, as an interface to transfer to a wireless base station, or the like (not shown), time/timing pulse output p3 regenerated from the master device 22 or the GNSS 24.

Hereafter, when the slave device 25 cannot acquire the time/timing pulse output p2 from the GNSS 24, the slave device 25 reads out difference information from the storage unit, carries out time synchronization with the master device 22 using the read difference information, and outputs the time/timing pulse output p3.

While synchronization protocol used by the master device 22 and the slave device 25 are not specified in the example above described, a time•timing transmission system such as IEEE 1588v2 or NTP protocol can be used.

Figure 3:
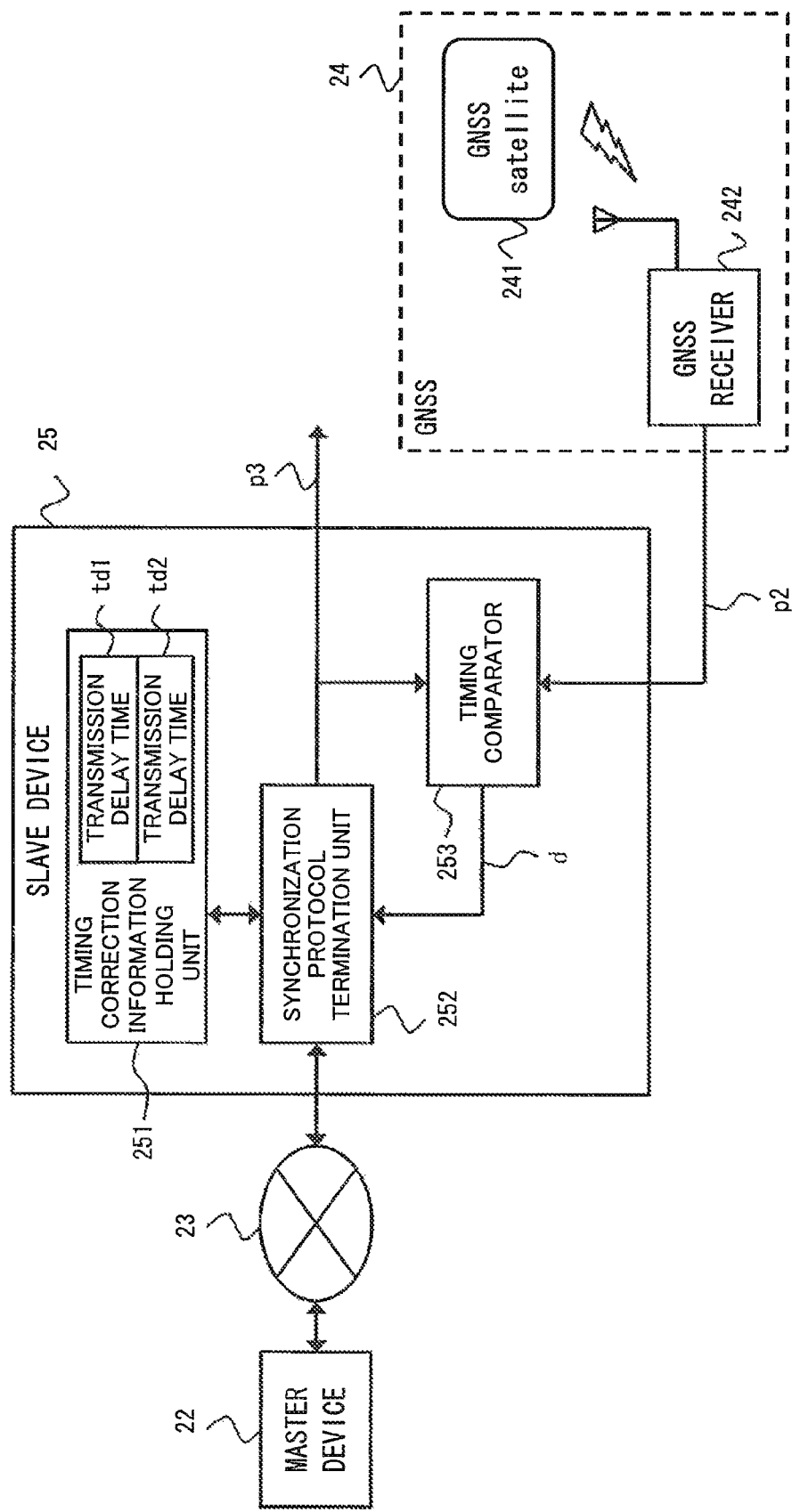
FIG. 3 is a block diagram illustrating a configuration of a slave device of the exemplary embodiment 2 of the invention.

FIG. 3 is a block diagram illustrating a configuration of the slave device 25 of the exemplary embodiment 2 of the invention. Since configurations other than the slave device 25 in FIG. 3 are equivalent to FIG. 2, the explanations are omitted. The slave device 25 includes a timing correction information holding unit 251, a synchronization protocol termination unit 252 and a timing comparator 253.

The synchronization protocol termination unit 252 terminates a packet for time synchronization from the master device 22, calculates transmission delay times td1 and td2 between the master device 22 and the slave device 25 and outputs the regenerated time/timing pulse output p3. Besides, the synchronization protocol termination unit 252 calculates a time in the slave device 25 in consideration of an asymmetrical transmission delay time of the transmission system 23. Publicly known technologies can be used for the synchronization protocol termination unit 252.

The timing comparator 253 calculates time/timing difference information d using the time information 250 of the slave device 25 calculated without considering asymmetrical transmission delay time for each transmission path (time/timing pulse output p3) and a reference time on the basis of the time/timing pulse output p2 acquired from the GNSS 24. Then, the synchronization protocol termination unit 252 calculates the transmission delay time for each transmission path td1 and td2 and stores the result in the timing correction information holding unit 251. Publicly known technologies can be employed for the timing comparator 253.

The timing correction information holding unit 251 is a storage apparatus which stores the transmission delay times td1 and td2. For example, the transmission delay time td1 is a delay time in the transmission from the master device 22 to the slave device 25, and the transmission delay time td2 is a delay time in the transmission from slave device 25 to the master device 22. That is to say, the synchronization protocol termination unit 252 stores the bidirectional transmission delay times between the slave device 25 and the master device 22 into the timing correction information holding unit 251, as difference information.

Here, the timing comparator 253 and the synchronization protocol termination unit 252 may be difference information calculation means which calculates the difference information (time/timing difference information d) between the first time information (time information 220) and the second time information (time/timing pulse output p2), and stores the difference information into the timing correction information holding unit 251. That is to say, the synchronization protocol termination unit 252 may store the difference information itself into the timing correction information holding unit 251.

When the time/timing pulse output p2 can be acquired from the GNSS 24, the synchronization protocol termination unit 252 carries out time synchronization with the master device 22 on the basis of the time/timing pulse outputs p1 and p2.

Figure 4:
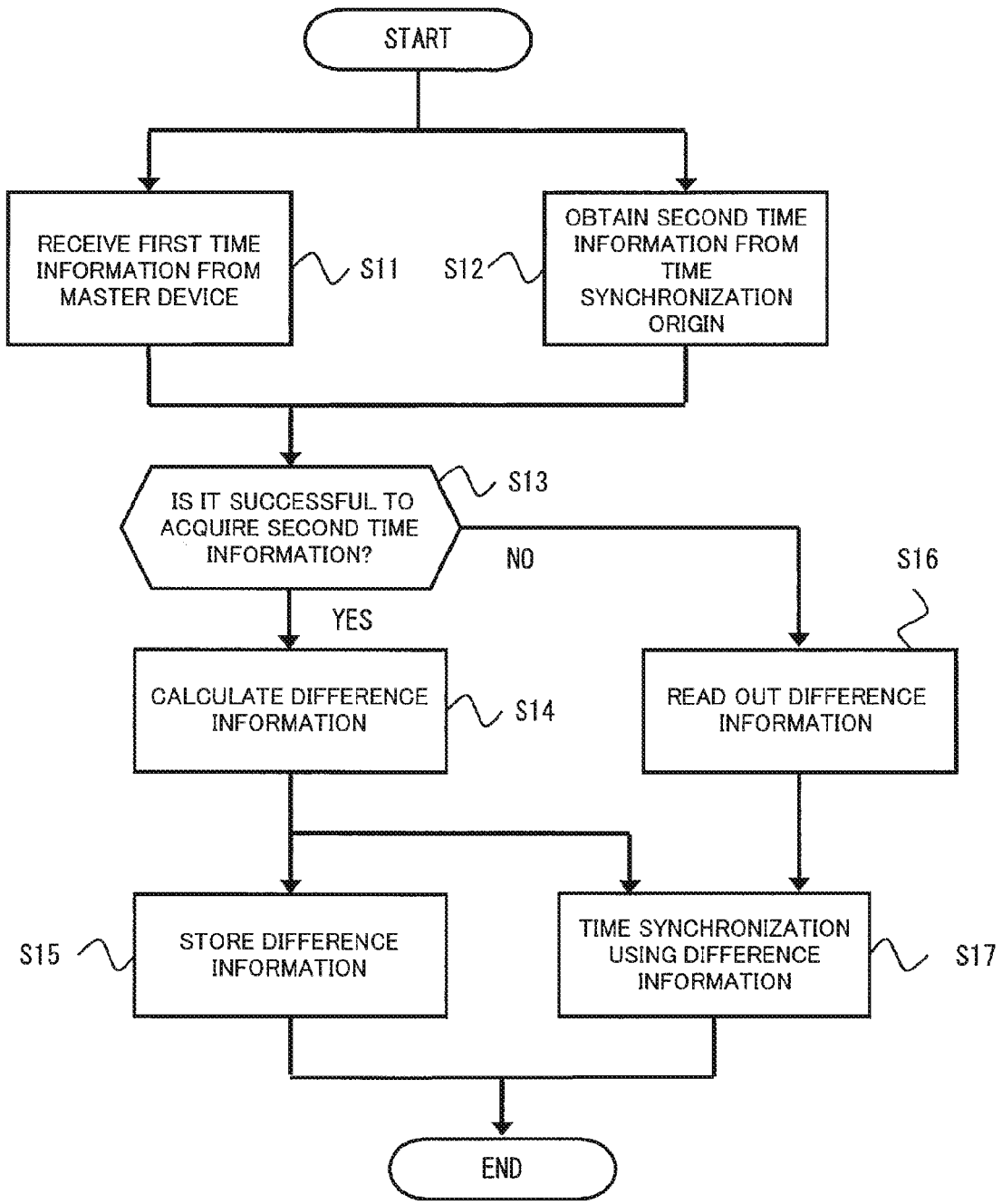
FIG. 4 is a flowchart explaining a flow of a time synchronization process of the exemplary embodiment 2 of the invention.

FIG. 4 is a flowchart explaining a flow of a time synchronization process of the exemplary embodiment 2 of the invention. Initially, the synchronization protocol termination unit 252 receives the first time information (e.g. time information 220) from the master device 22 (S11). The timing comparator 253 tries to acquire the second time information (e.g. time/timing pulse output p2) from the GNSS receiver 242 which is a time synchronization origin (S12). Whether or not acquisition of the second time information from the GNSS receiver 242 becomes successful is determined at this point (S13).

If the GNSS 24 is normal, acquisition of the second time information is successful (YES in step S13), and the timing comparator 253 calculates the time/timing difference information d, as the difference information (S14). The synchronization protocol termination unit 252 stores the difference information in the timing correction information holding unit 251 (S15). In addition, the synchronization protocol termination unit 252 carries out time synchronization with the master device 22 using the difference information (S17).

On the other hand, when it is determined that acquisition of the second time information from the GNSS receiver 242 fails in step S13, the synchronization protocol termination unit 252 reads out the difference information from the timing correction information holding unit 251 (S16). The case that the GNSS 24 fails and the case that the slave device 25 cannot fully receive the time/timing pulse outputs p2 due to a radio wave condition, etc. are exemplified.

The synchronization protocol termination unit 252 carries out time synchronization with the master device 22 using the read difference information (S17).

Subsequently, calculation of the transmission delay time in the slave device 25 of the exemplary embodiment 2 is described below. The transmission delay time td1 is a time which is required for transmission of a specific packet from the master device 22 to the slave device 25. Here, suppose a transmitting time of the packet in the master device 22 is "A1".

The synchronization protocol termination unit 252 receives the packet including the transmitting time A1 from the master device 22. Next, the synchronization protocol termination unit 252 regenerates the time/timing pulse outputs p3 based on the transmitting time A1. Besides, the slave device 25 acquires the reference time B1 based on the time/timing pulse outputs p2 from the GNSS receiver 242. Then, the timing comparator 253 can calculate the transmission delay time td1 as the time/timing difference information d by comparing the transmitting time A1 with the reference time B1. Here, the transmission delay time td1 can be calculated using the following equation (4).

$$td1 = B1 - A1 \qquad (4)$$

The slave device 25 in the exemplary embodiment 2 stores the transmission delay time td1 into the timing correction information holding unit 251. Therefore, even though the time reference based on the GNSS 24 is lost, the slave device 25 can calculate a time B1' of the slave device 25 from the transmitting time A1 using the transmission delay time td1 which is already held in the timing correction information holding unit 251. Therefore, it is possible to keep time synchronization. Here, the time B1' of the slave device 25 can be calculated by the following equation (5).

$$B1' = A1 + td1 \qquad (5)$$

Besides, the transmission delay time td2 is a time which is required for transmission of a specific packet from the slave device 25 to the master device 22. Here, suppose a transmitting time of the packet in the slave device 25 is "B2".

Initially, the slave device 25 transmits the packet including the transmitting time B2 to the master device 22. Next, by comparing a time A2 at which the packet is received with the transmitting time B2 included in the packet, the master device 22 can calculate the transmission delay time td2. These techniques can be achieved on the basis of IEEE 1588. The transmission delay time td2 can be calculated by the following equation (6).

$$td2 = A2 - B2 \qquad (6)$$

After that, the master device 22 informs the slave device 25 of the transmission delay time td2. The slave device 25 stores the transmission delay time td2 into the timing correction information holding unit 251. Thereby appropriateness can be examined even though a transmission path of the transmission system 23 is changed. The reason is explained below.

Initially, in the time synchronization system, transmission delay amount between the master device 22 and the slave device 25 can be calculated on the basis of a round-trip time Z of a packet. In this case, when a round-trip time of a packet for time synchronization is represented as Z, it can be shown as the following equation (7).

$$Z = X + Y \qquad (7)$$

For that reason, it is potentially considered that the time B2' of the slave device 25 can be calculated without using the transmission delay time td2 when the time reference based on the GNSS 24 is lost. However, the transmission delay amount changes if a transmission path in the transmission system 23 is changed. In this case, the round-trip time Z also changes. Therefore, accuracy of the time B2' cannot be kept if Z is used. The slave device 25 cannot examine appropriateness of the transmission delay amount based only on the transmission delay time td1. Therefore, as described above, the slave device 25 has to store the transmission delay time td2 in the timing correction information holding unit 251.

As described above, the time synchronization system 200 of the exemplary embodiment 2 includes the following advantageous effects. Initially, in the time synchronization system having asymmetrical delay in the transmission path thereof, by measuring an asymmetrical delay time of the transmission path using time information as a reference, accuracy of time synchronization can be kept even though a failure of the time information as a reference occurs. Besides, even though a failure of the time information which is a reference for GNSS occurs, since the reference time is kept in the time synchronization system, a low-cost frequency source can be used.

An Exemplary Embodiment 3 of the Invention

An exemplary embodiment 3 of the invention is a modified example of the above embodiment 2. The difference from the exemplary embodiment 2 is to use the transmission system in which bidirectional transmission delay times are symmetrical as a synchronization origin of the slave device instead of GNSS.

FIG. 5 is a block diagram illustrating a configuration of a slave device 25a of the exemplary embodiment 3 of the invention. The same configurations as those of FIG. 3 are indicated with the same signs and explanations thereon are omitted. Initially, a master device 27 is a communication apparatus which is a synchronization source which is different from the master device 22. The master device 27 is one example of the time synchronization origin 14 of FIG. 1. In a transmission system 26, the bidirectional transmission delay times are symmetrical.

The slave device 25a includes a synchronization protocol termination unit 254 and a timing correction information holding unit 255 in addition to the timing correction information holding unit 251, the synchronization protocol termination unit 252, and the timing comparator 253. The synchronization protocol termination unit 254 terminates a packet for time synchronization from the master device 27, calculates transmission delay times td3 and td4 between the master device 27 and the slave device 25, and outputs regenerated time/timing pulse. Further, the synchronization protocol termination unit 254 stores the transmission delay times td3 and td4 in the timing correction information holding unit 255. Since the transmission system 26 includes the symmetrical transmission delay times, the synchronization protocol termination unit 254 can calculate the transmission delay times td3 and td4 by using existing techniques. The timing correction information holding unit 255 is equivalent to the timing correction information holding unit 251.

For this reason, even if the transmission system 23 includes asymmetrical delay characteristics, the slave device 25a can stably acquire the reference time from the transmission system 26. In particular, even if the reference time is not acquired from the master device 27, by using the transmission delay times td3 and td4 stored in advance in the timing correction information holding unit 255, it is possible to give redundancy to the slave device 25a.

Even though the transmission system 26 includes asymmetrical delay characteristics in FIG. 5, by holding in advance the transmission delay times td3 and td4 in the timing correction information holding unit 255, equivalent redundancy can be kept.

Other Description of Exemplary Embodiment

A conventional time synchronization system has the following problems. A first problem is that correct time synchronization cannot be calculated due to a state of asymmetrical delay of a network communication path in the time synchronization system. A second problem is that since fault-tolerance of GNSS has to be increased when correct time synchronization cannot be calculated, a time synchronization error has to be minimized by using an expensive frequency source with high accuracy.

Therefore, the exemplary embodiment 1 and the like of the invention described above improve the problem that accuracy of synchronization reference cannot be acquired due to the transmission asymmetry of the time synchronization system, and provide a means of solving using the time synchronization system for improvement of fault-tolerance of GNSS. That is to say, in the time synchronization system in which the transmission path has the asymmetrical delay time, another reference time is set, the asymmetrical delay time of the transmission path is measured using the reference time to be used for calculation of the time synchronization system. Thereby uncertainty of time synchronization in which the transmission path has asymmetrical delay characteristics can be resolved in advance.

The slave device 25 in FIG. 3, in particular, includes the timing correction information holding unit 251. Further, the slave device 25 calculates the time/timing difference information d of a regeneration time of the master device 22 based on the reference time, using the time/timing pulse output p2 of the GNSS 24 and the time/timing pulse output p3 regenerated from the time information received from the master device 22. After that, the slave device 25 calculates in advance asymmetrical transmission delay times td1 and td2 for each transmission path in the transmission system 23 by using the time/timing difference information d.

By calculating in advance the asymmetrical transmission delay times for each transmission path, it is resolved that uncertainty of time synchronization occurs only by the time synchronization system when the transmission delay time for each transmission path is different. Thereby the reference time can be kept only by the time synchronization system even when GNSS goes wrong.

The exemplary embodiment 1, etc, calculate a total of delay times of respective transmission paths in the time synchronization system using the time information from a time synchronization source of GNSS, etc. and the time information calculated in the time synchronization system in which the transmission path includes asymmetrical delay. The time synchronization system is operated using the total of the delay times in consideration of asymmetry of each transmission path, so that accuracy of time synchronization in the time synchronization system having asymmetrical delay in the transmission path is guaranteed.

As a specific example, in a situation in which reception accuracy is guaranteed by a GNSS receiver in the slave device, a time of an apparatus is determined using a timing pulse which is synchronized with GNSS and time information. On the other hand, the time synchronization system is also operated and a synchronization operation with a different apparatus synchronized with GNSS is carried out. Here, in order to calculate a delay time for each transmission path, the time information calculated from the GNSS receiver, the synchronization time calculated in the time synchronization system and the bidirectional delay time are used. Thus, when the time information cannot be acquired from GNSS, the time synchronization system is used by using delay time information for each transmission path which is calculated in a normal state. Thereby time synchronization accuracy can be kept.

The exemplary embodiments 1 to 3 can be applied to a wireless base station apparatus which is required to accurately use the time synchronization, such as 3G (3rd Generation), LTE (Long Term Evolution), WiMAX (Worldwide Interoperability for Microwave Access), or PHS (Personal Handy-phone System), and which is difficult to stably use the GNSS synchronization system.

The invention of the present application is not limited to the above mentioned exemplary embodiments. It is to be understood that to the configurations and details of the invention of the present application, various changes can be made within the scope of the invention of the present application.

A whole part or part of the exemplary embodiments disclosed above can be described as, but not limited to, the following supplementary notes.

(Supplementary Note 1)

A communication apparatus which includes
a storage unit for storing in advance difference information between first time information and second time information, the first time information being received from a synchronization source communication apparatus as a time synchronization source connected to a transmission system wherein transmission delay time is different depending on the direction of transmission and the second time information obtained from a time synchronization origin other than the transmission system, and
time synchronization means for carrying out, when the second time information cannot be obtained from the time synchronization origin, time synchronization with the synchronization source communication apparatus using the difference information read out from the storage unit.

(Supplementary Note 2)

The communication apparatus described in the supplementary note 1 which is characterized in further including difference information calculation means for calculating the difference information between first time information and second time information and for storing the difference information in the storage unit.

(Supplementary Note 3)

The communication apparatus described in the supplementary note 2 which is characterized in that the time synchronization means carries out time synchronization with the synchronization source communication apparatus on the basis of the first time information and the second time information when the second time information can be obtained from the time synchronization origin.

(Supplementary Note 4)

The communication apparatus described in the supplementary note 2 which is characterized in that the difference information calculation means stores bidirectional transmission delay times of the means itself and the synchronization source communication apparatus, as the difference information, into the storage unit.

(Supplementary Note 5)

The communication apparatus of any one of the supplementary notes 1 to 4 which is characterized in that the time synchronization origin is a satellite positioning system.

(Supplementary Note 6)

The communication apparatus of any one of the supplementary notes 1 to 4 which is characterized in that the time synchronization origin is a transmission system in which bidirectional transmission delay times are symmetrical.

(Supplementary Note 7)

A time synchronization system, including,
a transmission system in which transmission delay time is different depending on the direction of transmission,
a first communication apparatus that is connected to the transmission system, as a time synchronization source,
a time synchronization origin other than the transmission system, and
a second communication apparatus that is connected to the transmission system and the time synchronization origin and carries out time synchronization on the basis of time information of the first communication apparatus,
the second communication apparatus includes
a storage unit for storing in advance difference information between first time information received from the first communication apparatus and second time information obtained from the time synchronization origin, and
time synchronization means for carrying out, when the second time information cannot be obtained from the time synchronization origin, time synchronization with the first communication apparatus using the difference information read out from the storage unit.

(Supplementary Note 8)

The time synchronization system described in the supplementary note 7 characterized in that the second communication apparatus further includes difference information calculation means for calculating the difference information between first time information and second time information and for storing the difference information in the storage unit.

(Supplementary Note 9)

The time synchronization system described in the supplementary note 8 characterized in that the time synchronization means carries out time synchronization with the first communication apparatus on the basis of the first time information and the second time information when the second time information can be obtained from the time synchronization origin.

(Supplementary Note 10)

The time synchronization system described in the supplementary note 8 characterized in that the difference information calculation means stores bidirectional transmission delay times of the means itself and the first communication apparatus, as the difference information, into the storage unit.

(Supplementary Note 11)

A time synchronization method, including
receiving first time information from a synchronization source communication apparatus as a time synchronization source connected to a transmission system wherein transmission delay time is different depending on the direction of transmission,
obtaining second time information from a time synchronization origin other than the transmission system,
calculating difference information between the first time information and the second time information,
storing the difference information in a storage means,
after that, reading out the difference information from the storage means when the second time information cannot be obtained from the time synchronization origin, and
carrying out time synchronization with the synchronization source communication apparatus using the difference information read out from the storage means.

The invention of the present application is explained by referring to the exemplary embodiments. The invention of the present application is not limited to the above description. It is to be understood that to the configurations and details of the invention of the present application, a person ordinarily skilled in the art can make various changes within the scope of the invention of the present application.

This application is based upon and claims the benefit of priority from Japanese Patent Application No. 2012-166669 filed on Jul. 27, 2012, the disclosure of which is incorporated herein in its entirety by reference.

REFERENCE SIGNS LIST 100 time synchronization system
11 synchronization source communication apparatus
12 transmission system
13 communication apparatus
131 storage unit
1311 difference information
132 time synchronization unit
14 time synchronization source
t1 first time information
t2 second time information
200 time synchronization system
21 GNSS
211 GNSS satellite
212 GNSS receiver
22 master device
220 time information
23 transmission system
231 communication relaying apparatus
232 communication relaying apparatus
233 communication relaying apparatus
24 GNSS
241 GNSS satellite
242 GNSS receiver
25 slave device
25a slave device
250 time information
251 timing correction information holding unit
252 synchronization protocol termination unit
253 timing comparator
254 synchronization protocol termination unit
255 timing correction information holding unit
26 transmission system
27 master device
p1 time/timing pulse output
p2 time/timing pulse output
p3 time/timing pulse output
d time/timing difference information
td1 transmission delay time
td2 transmission delay time
td3 transmission delay time
td4 transmission delay time

The invention claimed is:

1. A communication device, comprising:
a memory storing instructions;
a storage unit configured to store difference information reflecting a difference between first time information and second time information
a processor configured to execute the instructions to:
receive the first time information from a first communication apparatus connected to a transmission system;
obtain the second time information from a time synchronization origin connected to a second communication apparatus, wherein a first transmission delay time in a first direction from the first communication apparatus to the second communication apparatus through a transmission system is different than a second transmission delay time in a second direction from the second communication apparatus to the first communication apparatus through the transmission system;
determine whether the second time information can be obtained from the time synchronization origin; and
implement, when it is determined that the second time information cannot be obtained from the time synchronization origin, time synchronization with the first communication apparatus using the difference information read out from the storage unit.

2. The communication device of claim 1, wherein the processor is further configured to execute the instructions to:
calculate the difference information and to store the difference information to the storage unit.

3. The communication device of claim 1, wherein the processor is further configured to execute the instructions to carry out time synchronization with the first communication apparatus on the basis of the first time information and the second time information when it is determined that the second time information can be obtained from the time synchronization origin.

4. The communication device of claim 1, wherein the first communication apparatus comprises a synchronization source communication apparatus configured to receive a time reference from a satellite positioning system.

5. The communication device of claim 1, wherein the time synchronization origin is a satellite positioning system.

6. The communication device of claim 1, wherein the time synchronization origin is a second transmission system in which bidirectional transmission delay times are symmetrical.

7. The communication device of claim 1, wherein the first communication apparatus is a master device, and the second communication apparatus is a slave device.

8. The communication device of claim 7, wherein the master device is configured to transmit and receive a packet for time synchronization with the slave device via the transmission system.

9. The communication device of claim 8, wherein the transmission system comprises a different quantity of communication relaying apparatuses along a first transmission path in the first direction and a second transmission path in the second direction.

10. The communication device of claim 1, wherein a first transmission speed in the first direction is different from a second transmission speed in the second direction.

11. A time synchronization system, comprising:
a transmission system in which a transmission delay time is different depending on a direction of transmission;
a first communication apparatus that is connected to the transmission system and configured as a time synchronization source;
a time synchronization origin; and
a second communication apparatus connected to the transmission system and the time synchronization origin, wherein the second communication apparatus comprises:
a memory storing instructions;
a storage unit configured to store difference information reflecting a difference between first time information received from the first communication apparatus and second time information obtained from the time synchronization origin, wherein a first transmission delay time in a first direction from the first communication apparatus to the second communication apparatus through the transmission system is different than a second transmission delay time in a second direction from the second communication apparatus to the first communication apparatus through the transmission system; and a processor configured to execute the instructions to:
determine whether the second time information can be obtained from the time synchronization origin; and implement, when it is determined that the second time information cannot be obtained from the time synchronization origin, time synchronization with the first communication apparatus using the difference information read out from the storage unit.

12. The time synchronization system of claim 11, wherein the processor is further configured to execute the instructions to calculate the difference information and to store the difference information in the storage unit.

13. The time synchronization system of claim 12, wherein the processor is further configured to execute the instructions to store, in the storage unit, bidirectional transmission delay times of transmission between the second communication apparatus and the first communication apparatus, as the difference information.

14. The time synchronization system of claim 11, wherein the processor is further configured to execute the instructions to implement time synchronization with the first communication apparatus on the basis of the first time information and the second time information when it is determined that the second time information can be obtained from the time synchronization origin.

15. The time synchronization system of claim 11, wherein a first transmission speed in the first direction is different from a second transmission speed in the second direction.

16. The time synchronization system of claim 11, wherein the transmission system comprises a different quantity of communication relaying apparatuses along a first transmission path in the first direction and a second transmission path in the second direction.

17. The time synchronization system of claim 11, wherein the time synchronization origin comprises a satellite positioning system.

18. A time synchronization method, comprising:
receiving first time information from a first communication apparatus connected to a transmission system;

obtaining second time information from a time synchronization origin connected to a second communication apparatus, wherein a first transmission delay time in a first direction from the first communication apparatus to the second communication apparatus through the transmission system is different than a second transmission delay time in a second direction from the second communication apparatus to the first communication apparatus through the transmission system;

calculating difference information reflecting a difference between the first time information and the second time information;

storing the difference information in a storage unit;

determining whether the second time information can be obtained from the time synchronization origin; and reading out the difference information from the storage unit when it is determined that the second time information cannot be obtained from the time synchronization origin; and implementing time synchronization with the first communication apparatus using the difference information read out from the storage unit.

19. The time synchronization method of claim 18, comprising directing a first transmission path in the first direction through a different quantity of communication relaying apparatuses than a second transmission path in the second direction.

20. The time synchronization method of claim 18, wherein a first transmission speed in the first direction is different from a second transmission speed in the second direction.

* * * * *